(12) United States Patent
Vallamkondu et al.

(10) Patent No.: US 12,169,152 B2
(45) Date of Patent: Dec. 17, 2024

(54) PRESSURE MONITORING SYSTEMS AND METHODS FOR PRESSURE BOTTLE

(71) Applicant: GOODRICH CORPORATION, Charlotte, NC (US)

(72) Inventors: Aswin Kumar Vallamkondu, Bangalore (IN); Jeffrey Martin Werbelow, Phoenix, AZ (US); Sivakumar Laguduwa, Bangalore (IN); Karthik Jegatheeswaran, Bengaluru (IN); Venkata Sai Sudheer Kumar Vennelakanti, Bengaluru (IN); Naveen Kumar Devarakonda, Bengaluru (IN)

(73) Assignee: GOODRICH CORPORATION, Charlotte, NC (US)

( * ) Notice: Subject to any disclaimer, the term of this patent is extended or adjusted under 35 U.S.C. 154(b) by 390 days.

(21) Appl. No.: 17/590,183

(22) Filed: Feb. 1, 2022

(65) Prior Publication Data
US 2023/0175905 A1    Jun. 8, 2023

(30) Foreign Application Priority Data
Dec. 2, 2021 (IN) .............................. 202141055925

(51) Int. Cl.
*G01L 9/00*      (2006.01)
*G01N 29/04*      (2006.01)
*G01N 29/24*      (2006.01)

(52) U.S. Cl.
CPC .......... *G01L 9/0025* (2013.01); *G01N 29/043* (2013.01); *G01N 29/2481* (2013.01)

(58) Field of Classification Search
CPC ................ G01L 9/0025; G01N 29/043; G01N 29/2481; G01N 291/02872; G01N 29/07; G01N 2291/011; G01N 2291/2695

USPC .......................................................... 73/702
See application file for complete search history.

(56) References Cited

U.S. PATENT DOCUMENTS

| | | | | |
|---|---|---|---|---|
| 5,741,962 | A * | 4/1998 | Birchak | G01V 1/40 73/152.16 |
| 6,354,147 | B1 * | 3/2002 | Gysling | G01N 29/024 73/61.79 |
| 7,392,706 | B2 | 7/2008 | Momose et al. | |
| 7,755,489 | B2 | 7/2010 | Georgescu et al. | |
| 8,006,563 | B2 | 8/2011 | Teshigahara et al. | |
| 8,931,347 | B2 * | 1/2015 | Donzier | G01L 9/0041 73/706 |
| 9,019,119 | B2 * | 4/2015 | Loi | H01Q 1/42 340/856.4 |
| 9,273,543 | B2 * | 3/2016 | Baca | E21B 34/02 |
| 9,379,426 | B2 * | 6/2016 | Loi | E21B 17/006 |
| 9,581,297 | B2 * | 2/2017 | Downie | G01N 9/002 |

(Continued)

FOREIGN PATENT DOCUMENTS

GB      2571141      8/2019

OTHER PUBLICATIONS

European Patent Office, European Search Report dated May 9, 2023 in Application No. 2221093.5.

*Primary Examiner* — Jacques M Saint Surin
(74) *Attorney, Agent, or Firm* — SNELL & WILMER L.L.P.

(57) ABSTRACT

A compressed fluid source assembly may comprise: a pressure cylinder configured to receive a compressed fluid source therein; and a surface acoustic wave (SAW) sensor coupled to an external surface of the pressure cylinder.

16 Claims, 4 Drawing Sheets

(56) References Cited

U.S. PATENT DOCUMENTS

| | | |
|---|---|---|
| 2006/0055531 A1 | 3/2006 | Cook et al. |
| 2015/0013461 A1 | 1/2015 | Pollard et al. |
| 2022/0196501 A1* | 6/2022 | Vennelakanti ....... G01N 29/036 |
| 2023/0166852 A1* | 6/2023 | Mugeraya .............. B64D 25/14 |
| | | 244/138 R |

* cited by examiner

PRESSURE MONITORING SYSTEMS AND METHODS FOR PRESSURE BOTTLE

CROSS-REFERENCE TO RELATED APPLICATIONS

This application is a non-provisional of, and claims priority to, and the benefit of India Provisional Application No. 202141055925 with DAS Code 4A9D, entitled "PRESSURE MONITORING SYSTEMS AND METHODS FOR PRESSURE BOTTLE," filed on Dec. 2, 2021, which is hereby incorporated by reference in its entirety.

FIELD

The present disclosure relates generally to inflatable evacuation systems and, more particularly, to methods and apparatus used to monitor pressure inside the pressure bottle.

BACKGROUND

Inflatable evacuation systems may be found on various structures, including aircraft, boats, offshore drilling platforms and the like. The systems are typically equipped with an inflatable or an inflatable device, such as, for example, an inflatable slide or an inflatable raft, configured to facilitate rapid evacuation of persons in the event of an emergency. Such inflatables are typically stored in an uninflated condition on the structure in a location readily accessible for deployment. For example, an evacuation slide for a commercial aircraft is stored in an uninflated condition in a case or compartment located proximate an emergency exit.

Systems used to inflate evacuation slides typically employ a gas stored within a cylinder or tank at high pressure, which is discharged into the evacuation slide (or into an inflatable tube comprised within the evacuation slide) within a specific time period. This may be accomplished, for example, by opening a main inflation valve that connects the high-pressure gas to the inflatable tube. Since fast inflation times for an evacuation slide or raft are important, most inflation systems will have excess gas in the storage cylinder or tank to ensure complete inflation and to adjust for variations in ambient temperature and gas supply lines.

Monitoring of pressure within the cylinder or tank at high pressure typically includes a port. The port may be prone to leakage. Analog based pressure gauges may be bulky and/or have issues related to accuracy, complexity, and/or storage. Digital based systems may cause various issues related to power consumption.

SUMMARY

A compressed fluid source assembly is disclosed herein. The compressed fluid source may comprise: a pressure cylinder configured to receive a compressed fluid source therein; and a surface acoustic wave (SAW) sensor coupled to an external surface of the pressure cylinder.

In various embodiments, the SAW sensor comprises an input inter-digital transducer (IDT) spaced apart from an output IDT. The input IDT may be configured to receive a radio frequency input and transmit a surface acoustic wave toward the output IDT in response to receiving the radio frequency input. The output IDT may be configured to receive the surface acoustic wave and transmit a radio frequency output in response to receiving the surface acoustic wave.

In various embodiments, the SAW sensor comprises an inter-digital transducer (IDT) spaced apart from a reflector. The IDT may be configured to receive a radio frequency input, transmit a surface acoustic wave toward the reflector, receive the surface acoustic wave that is reflected, and transmit a radio frequency output in response to receiving the radio frequency input. A measurement of a time delay from transmitting the radio frequency output to receiving the radio frequency input may be configured to be transmitted to a processor to calculate a pressure in the compressed fluid source.

A pressure monitoring system is disclosed herein. The pressure monitoring system may comprise: a surface acoustic wave (SAW) sensor configured to couple to an external surface of a compressed fluid source; a transceiver in electronic communication with the SAW sensor; and a controller configured to: command the transceiver to transmit a radiofrequency signal to the SAW sensor; receive a delayed radio frequency signal from the SAW sensor through the transceiver, the delayed radio frequency signal including a measurement of a time delay from transmitting a radio frequency signal to receiving the radio frequency signal by the SAW sensor; and determine a pressure in the compressed fluid source based on the measurement of the time delay.

In various embodiments, determining the pressure in the compressed fluid source further comprises calculating a distance traveled by the surface acoustic wave based on the measurement of the time delay and calculating the pressure based on the distance traveled by the surface acoustic wave.

In various embodiments, the controller is further configured to compare the pressure to a pressure threshold. The controller may be further configured to generate an alert in response to the pressure being less than the pressure threshold. The pressure monitoring system may further comprise a display device, wherein the controller is further configured to send the alert to the display device for display.

In various embodiments, the SAW sensor comprises an input inter-digital transducer (IDT) spaced apart from an output IDT.

In various embodiments, the SAW sensor comprises an inter-digital transducer (IDT) spaced apart from a reflector.

An evacuation system is disclosed herein. The evacuation system may comprise: a compressed fluid source comprising an external surface; an evacuation slide coupled to the compressed fluid source; a surface acoustic wave (SAW) sensor coupled to the compressed fluid source; and a controller configured to determine a pressure in the compressed fluid source based on a data received from the SAW sensor.

In various embodiments, the evacuation system further comprises a transceiver in electrical communication with the controller and in electronic communication with the SAW sensor. The transceiver may be configured to send a radiofrequency signal to the SAW sensor in response to receiving a command from the controller. The transceiver may be configured to receive a second radio frequency signal from the SAW sensor after sending the radiofrequency signal to the SAW sensor. The second radio frequency signal may include a measurement of a time delay by the controller corresponding to a time period from sending to receiving a radio frequency wave from the SAW sensor. The controller may be configured to determine the pressure based on the measurement of the time delay.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation slides. However, various aspects of the disclosed systems and methods may be adapted for performance in a variety of other inflatable assemblies, for example, inflatable raft assemblies, and/or any other assemblies having inflatable structures. As such, numerous applications of the present disclosure may be realized.

Figure 1:
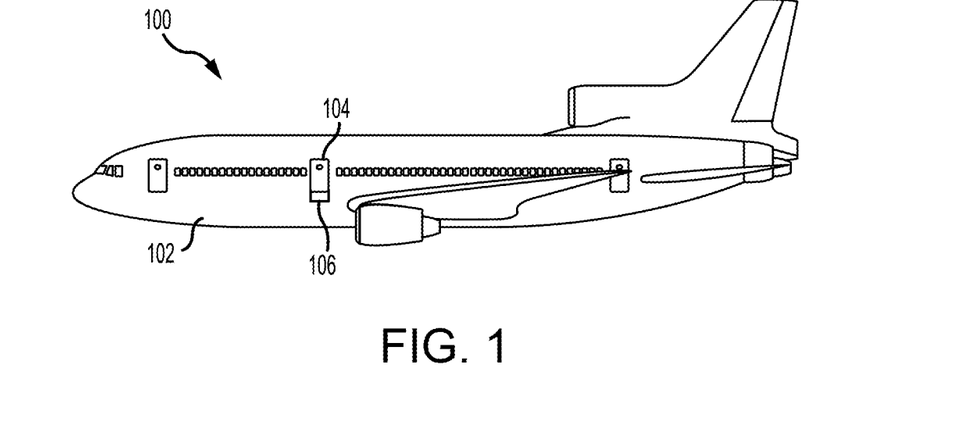
FIG. 1 illustrates an aircraft having an evacuation assembly, in accordance with various embodiments.

Referring now to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. It is contemplated and understood that evacuation system 106 may deploy in response to other actions taken by a passenger or crew member such as depression of a button, actuation of a lever, or the like.

Figure 2:
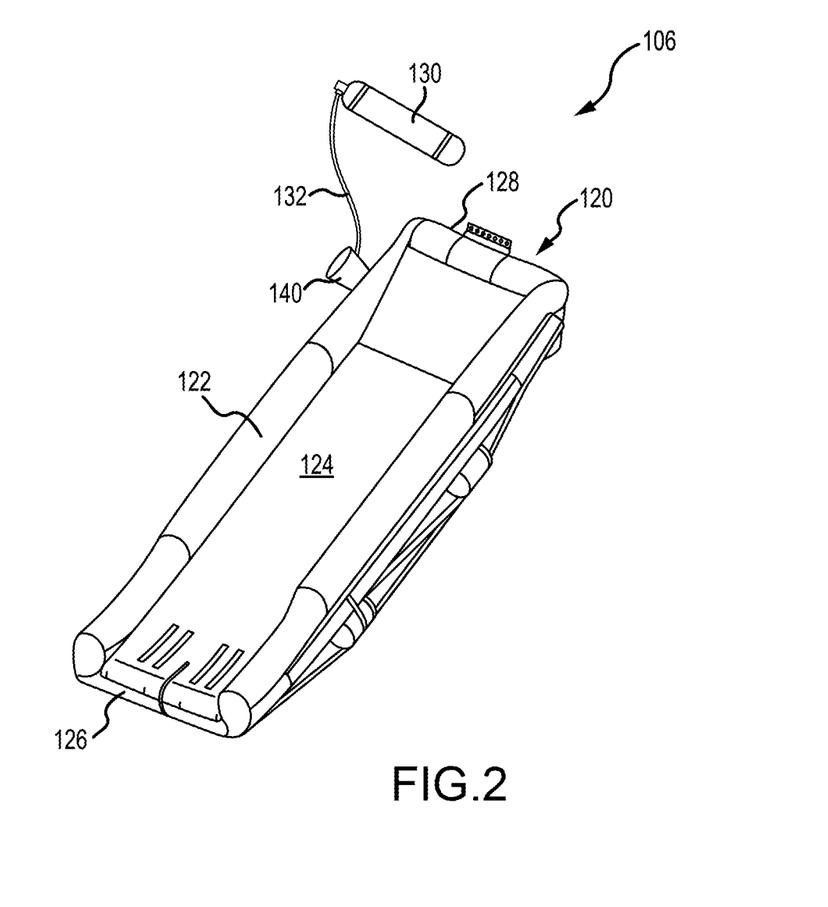
FIG. 2 illustrates an evacuation slide in a deployed position, in accordance with various embodiments.

With reference to FIG. 2, evacuation system 106 is illustrated with the evacuation slide in an inflated or "deployed" position. In accordance with various embodiments, evacuation system 106 includes an evacuation slide 120 and a compressed fluid source 130 configured to deliver a pressurized gas to inflate evacuation slide 120. During deployment, an inflatable tube 122 (or a plurality of inflatable tubes) of evacuation slide 120 is inflated using pressurized gas from compressed fluid source 130. Evacuation slide 120 may comprise a sliding surface 124 secured to the inflatable tube 122 and configured for sliding passenger egress from the emergency exit door 104 of the aircraft 100, with momentary reference to FIG. 1, to a ground surface in the event of an evacuation on land or to a water surface in the event of an evacuation on water. Evacuation slide 120 includes a toe end 126 and a head end 128 opposite toe end 126. Head end 128 may be coupled to an aircraft structure (e.g., fuselage 102 in FIG. 1). Sliding surface 124 extends from head end 128 to toe end 126. Evacuation slide 120 is illustrated as a single lane slide. However, evacuation slide 120 may comprise any number of lanes.

Compressed fluid source 130 is fluidly coupled to evacuation slide 120. For example, compressed fluid source 130 may be fluidly coupled to inflatable tube 122 via a hose, or conduit, 132. In various embodiments, evacuation system 106 may include an aspirator 140 fluidly coupled between compressed fluid source 130 and evacuation slide 120. Aspirator 140 is configured to entrain ambient air with gas output from compressed fluid source 130. For example, in response to deployment of evacuation slide 120, the gas from compressed fluid source 130 flows into aspirator 140 and causes aspirator 140 to draw in ambient air from the environment. The combination of gas flow from compressed fluid source 130 and the environmental gas is then directed into evacuation slide 120, thereby inflating inflatable tube 122.

Figure 3A:
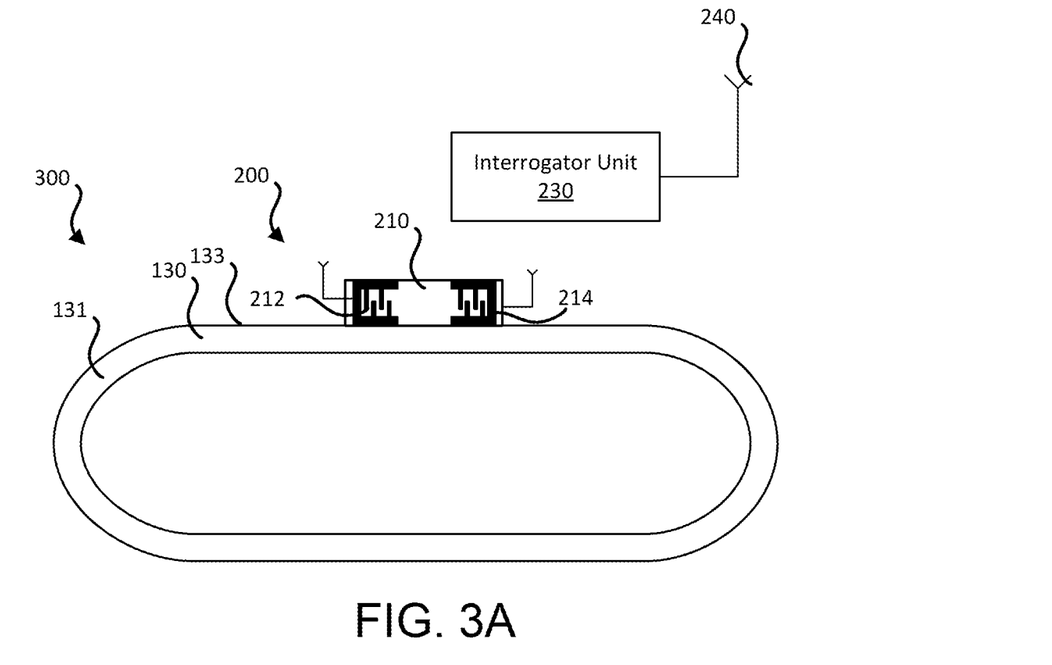
FIG. 3A illustrates a pressure monitoring system in accordance with various embodiments.

Referring now to FIG. 3A, a compressed fluid source assembly 300 including the compressed fluid source 130 is illustrated, in accordance with various embodiments. In various embodiments, the assembly 300 comprises the compressed fluid source 130 (e.g., a pressure cylinder 131), and a pressure monitoring system 200. "Cylinder" as described herein is not intended to denote solely a cylindrical shape. For example, pressure cylinder 131 may comprise a three dimensional shape having at least a circular cross-section, an oval cross-section, a racetrack cross-section having two straight lines and two half circles, or the like. In various embodiments, the pressure monitoring system 200 comprises a surface acoustic wave (SAW) sensor 210. A SAW sensor 210 brings into use electroacoustic properties of piezoelectric substrates, such as quartz, lithium, niobate, zinc oxide, etc. to generate surface acoustic waves. The mechanical vibrations generated propagate at a velocity depending on the material properties, such as elasticity, dielectric constants, etc.

The SAW sensor 210 may comprise an input inter-digital transducer (IDT) 212 and an output IDT 214. The IDTs 212, 214 may comprise a structure of overlapping conductive fingers. The overlapping conductive fingers may be fabricated on a piezoelectric substrate by a photolithographic process or the like. The IDT 212 transforms a received radiofrequency (RF) signal into a surface acoustic wave and IDT 214 also transforms the surface acoustic wave back into an RF signal. In various embodiments, the IDTs each comprise an antenna.

In various embodiments, the SAW sensor 210 is coupled to an external surface 133 of the pressure cylinder 131. Although illustrated as being coupled to an elongated side, the present disclosure is not limited in this regard. For example, the SAW sensor 210 could be coupled to a short side of the pressure cylinder 131 and still be within the scope of this disclosure. Similarly, the present disclosure is not limited to a racetrack shape as illustrated. In this regard, any geometry for a pressure cylinder is within the scope of this disclosure, including complex geometries, oval geometries, circular geometries, etc.

In various embodiments, the pressure monitoring system 200 further comprises an interrogator unit 230. In various embodiments, interrogator unit 230 may be integrated into computer system of the aircraft. In various embodiments, interrogator unit 230 may be configured as a central network element or hub to access various systems and components of the pressure monitoring system 200. Interrogator unit 230 may comprise a network, computer-based system, and/or software components configured to provide an access point to various systems and components of the pressure monitoring system 200. In various embodiments, interrogator unit 230 may comprise a processor. In various embodiments, interrogator unit 230 may be implemented in a single processor. In various embodiments, interrogator unit 230 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof interrogator unit 230 may comprise a processor configured to implement various logical operations in response to execution of instructions, for example, instructions stored on a non-transitory, tangible, computer-readable medium configured to communicate with interrogator unit 230.

Figure 3B:
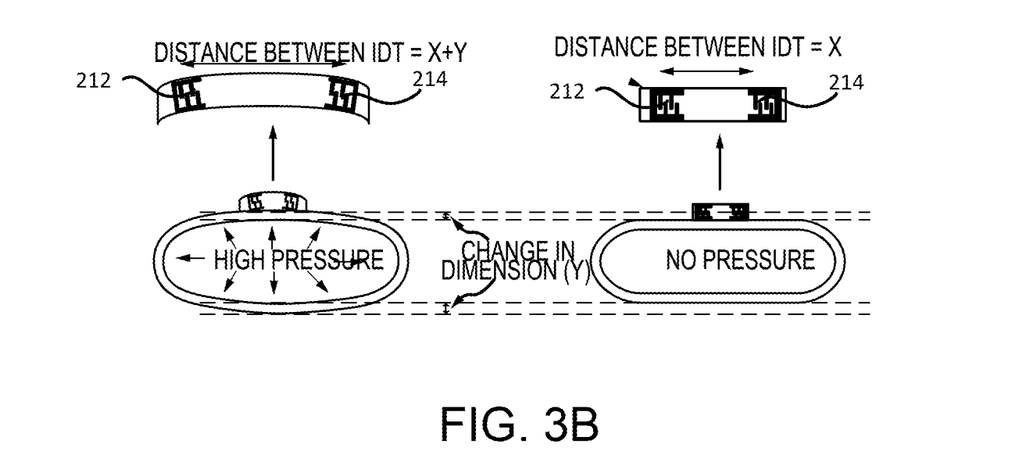
FIG. 3B illustrates a pressure monitoring system in use, in accordance with various embodiments.

In various embodiments, the pressure monitoring system 200 further comprises an antenna 240 coupled to, and in electrical communication with, the interrogator unit 230. The antenna 240 is configured to communicate electronically with the SAW sensor 210. For example, in response to receiving an indication from the interrogator unit 230 that a pressure measurement is desired, the antenna 240 sends an electronic signal (e.g., an RF signal) to an input antenna of the input IDT 212, the input IDT 212 converts the RF signal to a surface acoustic wave directed towards the output IDT 214, the output IDT 214 converts the surface acoustic wave to an RF signal and sends the RF signal back to the antenna 240. In this regard, the interrogator unit 230 determines a time delay from transmission of the RF wave to SAW sensor to reception of the RF wave from the SAW sensor. Based on the time delay duration a distance from the input IDT 212 to the output IDT 214 may be calculated. Based on the distance calculated from the time delay duration, a pressure in the bottle may be determined. For example, with brief reference to FIG. 3B, in an ambient pressure state (i.e., when pressure bottle is empty), the compressed fluid source 130 has no deformation. In response to being pressurized, the compressed fluid source 130 may begin to bow, causing the IDTs 212, 214 to be separated by a further distance than the zero pressure state and thus increasing the time delay between the sent RF signal and the received RF signal which will be sensed by the interrogator unit. In various embodiments, a pressure within the compressed fluid source 130 may be calculated based on the measured distance and based on measured time delay between the RF signal.

Figure 4A:
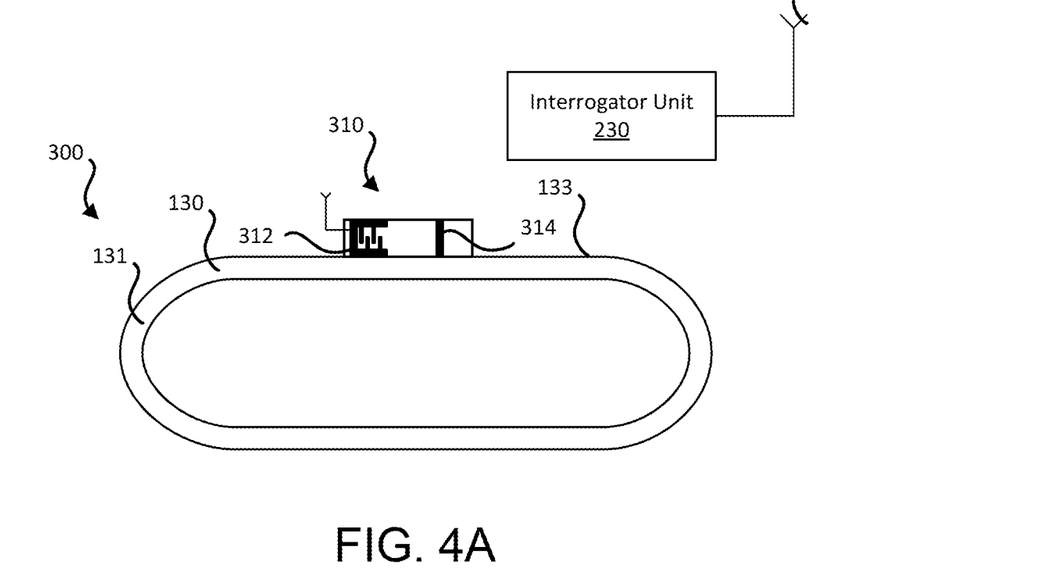
FIG. 4A illustrates a pressure monitoring system, in accordance with various embodiments.
Figure 4B:
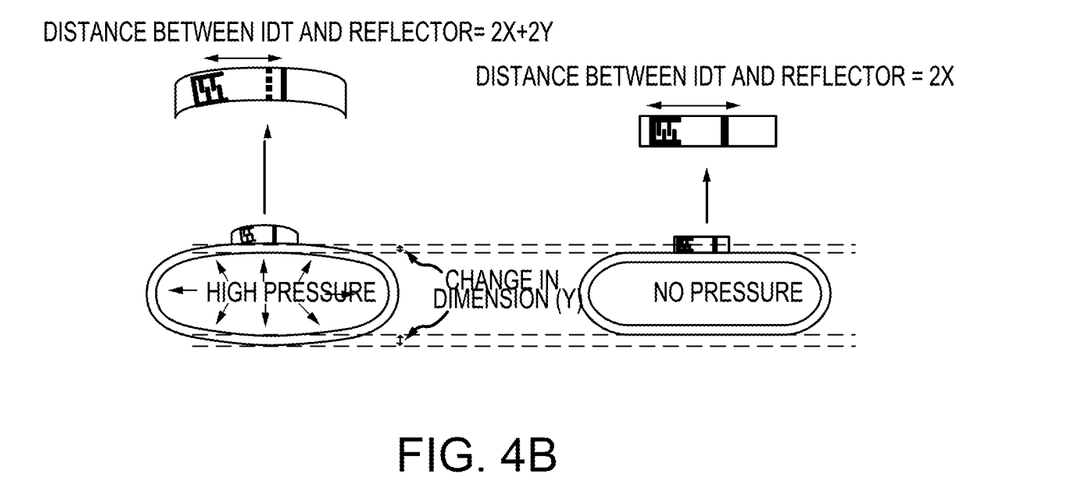
FIG. 4B illustrates a pressure monitoring system in use, in accordance with various embodiments.

Although illustrated as comprising IDTs 212, 214, the present disclosure is not limited in this regard. For example, with reference now to FIG. 4, a saw sensor 310 is illustrated, with like numerals denoting like elements, in accordance with various embodiments. The saw sensor 310 comprises an IDT 312 and a reflector 314. In this regard, the IDT 312 may be configured as an input IDT 212 and output IDT 214 combined. For example, the IDT 312 is configured to receive an RF signal, convert the RF signal to a surface acoustic wave, transmit the surface acoustic wave towards the reflector 314, convert the reflected acoustic wave back into an RF signal, and transmit the RF signal back to the antenna 240. Thus, the interrogator unit 230 may calculate a pressure within the compressed fluid source 130 based on the time delay duration in the manner described with respect to SAW sensor 210 and as illustrated in FIG. 4B.

Figure 5:
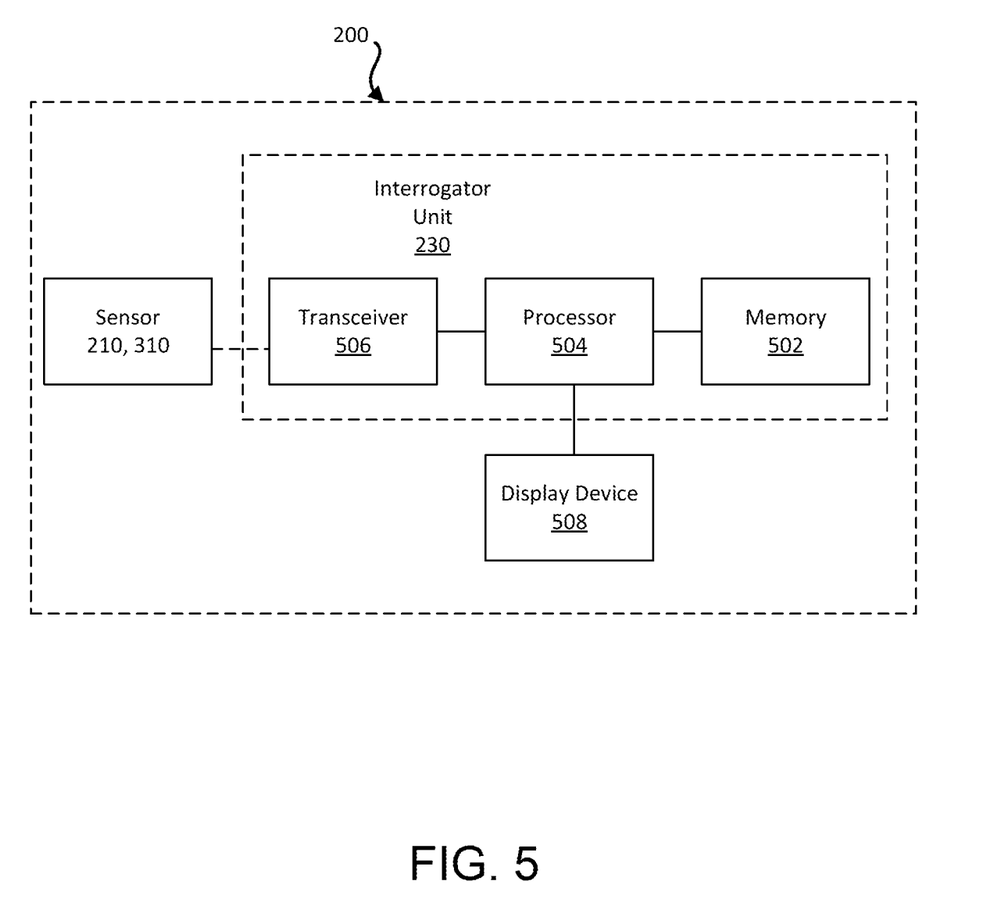
FIG. 5 illustrates a schematic view of a pressure monitoring system, in accordance with various embodiments.

Referring now to FIG. 5, a schematic view of the pressure monitoring system 200 is illustrated, in accordance with various embodiments. In various embodiments, the interrogator unit 230 comprises a memory 502, a processor 504 and a transceiver 506. The transceiver is configured to communicate electronically with the SAW sensor 210, 310 as described previously herein. In various embodiments, the processor 504 is configured to calculate a pressure in compressed fluid source 130 from FIGS. 3A, 4A as described previously herein based on measurements of the sensor 210, 310. In various embodiments, the processor is in electronic (e.g., wireless or wired) communication with a display device 508. The display device 508 may be configured to display a pressure in the compressed fluid source 130 from FIGS. 3A, 4A, in accordance with various embodiments. In various embodiments, the processor 504 may compare the calculated pressure to a pressure threshold. In response to the calculated pressure being below a pressure threshold, the processor may be configured to send a warning to be displayed on the display device (e.g., an indication signal or the like). In this regard, in response to a pressure being low in the compressed fluid source 130, a crew member may be notified via the display device 508, in accordance with various embodiments.

In various embodiments, the SAW sensor 210, 310 described previously herein may be operable without a power source. Thus, no external aircraft power is used for SAW sensor 210, 310 operation. SAW sensor 210, 310 for the pressure monitoring system 200 may be highly reliable and lighter rate relative to typical analog and digital pressure sensors typically used for compressed fluid sources. In various embodiments, the SAW sensor 210, 310 described previously herein may operate at higher temperatures in which typical pressure sensors may have degraded performance. In various embodiments, remote reading of pressure data may eliminate wiring to and from the compressed fluid source 130 from FIGS. 2, 3A, 4A. In various embodiments, by utilizing SAW sensor 210, 310, a pressure may be determined as described previously herein within the compressed cylinder without utilization of a port, thus eliminating a potential leak location, in accordance with various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An evacuation system, comprising:
a compressed fluid source comprising an external surface;
an evacuation slide coupled to the compressed fluid source;
a surface acoustic wave (SAW) sensor coupled to the external surface of the compressed fluid source;
a transceiver;
a display device; and
a controller in electrical communication with the transceiver, the controller configured to:
determine a pressure in the compressed fluid source based on data received from the SAW sensor,
compare the pressure to a pressure threshold,
generate an alert in response to the pressure being less than the pressure threshold, and
sending the alert to the display device.

2. The evacuation system of claim 1, wherein the SAW sensor comprises an input inter-digital transducer (IDT) spaced apart from an output IDT.

3. The evacuation system of claim 2, wherein the input IDT is configured to receive a radio frequency input and transmit a surface acoustic wave toward the output IDT in response to receiving the radio frequency input.

4. The evacuation system of claim 3, wherein the output IDT is configured to receive the surface acoustic wave and transmit a radio frequency output in response to receiving the surface acoustic wave.

5. The evacuation system of claim 1, wherein the SAW sensor comprises an inter-digital transducer (IDT) spaced apart from a reflector.

6. The evacuation system of claim 5, wherein the input IDT is configured to receive a radio frequency input, transmit a surface acoustic wave toward the reflector, receive the surface acoustic wave that is reflected, and transmit a radio frequency output in response to receiving the radio frequency input.

7. The evacuation system of claim 6, wherein a measurement of a time delay from transmitting the radio frequency output to receiving the radio frequency input is configured to be transmitted to a processor to calculate the pressure in the compressed fluid source.

8. The evacuation system of claim 1, wherein the transceiver is configured to send a radiofrequency signal to the SAW sensor in response to receiving a command from the controller.

9. The evacuation system of claim 8, wherein the transceiver is configured to receive a second radio frequency signal from the SAW sensor after sending the radiofrequency signal to the SAW sensor.

10. The evacuation system of claim 9, wherein the second radio frequency signal includes a measurement of a time delay by the controller corresponding to a time period from sending to receiving a radio frequency wave from the SAW sensor.

11. The evacuation system of claim 10, wherein the controller is configured to determine the pressure based on the measurement of the time delay.

12. A pressure monitoring system for the evacuation system of claim 1, wherein:
the transceiver is in electronic communication with the SAW sensor; and
the controller is further configured to:
command the transceiver to transmit a radiofrequency signal to the SAW sensor;
receive a delayed radio frequency signal from the SAW sensor through the transceiver, the delayed radio frequency signal including a measurement of a time delay from transmitting a radio frequency signal to receiving the radio frequency signal from the SAW sensor; and
determine the pressure in the compressed fluid source based on the measurement of the time delay.

13. The pressure monitoring system of claim 12, wherein determining the pressure in the compressed fluid source further comprises calculating a distance traveled by a surface acoustic wave based on the measurement of the time delay and calculating the pressure based on the distance traveled by the surface acoustic wave.

14. The pressure monitoring system of claim 12, wherein the SAW sensor comprises an input inter-digital transducer (IDT) spaced apart from an output IDT.

15. The pressure monitoring system of claim 12, wherein the SAW sensor comprises an inter-digital transducer (IDT) spaced apart from a reflector.

16. An aircraft comprising the evacuation system of claim 1.

* * * * *